Patented Sept. 12, 1944

2,358,130

UNITED STATES PATENT OFFICE 2,358,130

STABILIZATION

Charles R. Milone, Akron, Ohio, assignor to Wingfoot Corporation, Akron, Ohio, a corporation of Delaware No Drawing. Application August 25, 1942, Serial No. 456,091

5 Claims. (Cl. 260—485)

This invention relates to the stabilization of esters of monohalogenated maleic and fumaric acids, such as the chloro and bromo derivatives. It has been found that decomposition of these esters with liberation of hydrogen halide can be retarded or prevented by keeping the esters moist. The invention includes the moist compounds as new products, and it includes the storage of the esters in a moist condition.

When hydrogen halide is liberated from an ester of chloromaleic or chlorofumaric acid, the corresponding ester of acetylene dicarboxylic acid results. The instability of the chloro acid is largely or entirely independent of the nature of the esterifying radical. The ester may be a dialkyl ester, such as dimethyl or diethyl or diamyl, etc.; or a cycloalkyl ester, such as dimethylcyclohexyl, cyclopentyl, etc.; or an aralkyl ester, such as benzyl, phenyl ethyl, etc.; or a heterocyclic ester, such as furfuryl or tetrahydrofurfuryl, etc.; or an unsaturated aliphatic ester, such as vinyl, allyl, methallyl, crotonyl, or chloroallyl, etc.; or an ester of a polyhydric alcohol, etc.

The esters of chloromaleic acid and chlorofumaric acid are not appreciably soluble in water. In general, they dissolve less than 1 per cent of water. A small amount of water which is less than that required to saturate the ester will stabilize it and retard or prevent liberation of hydrogen chloride. The acetylene dicarboxylic acid which is formed when no stabilizer is used may interfere with the use of the ester of the chloro acid, even though present in small amount. In order to separate the acetylene dicarboxylic acid, distillation will ordinarily be required and oftentimes careful fractionation is necessary because of the small difference in boiling point between the ester of chloromaleic acid or chlorofumaric acid and the corresponding ester of acetylene dicarboxylic acid. By keeping the ester of the chloro acid moist, little decomposition of the ester of the chloro acid will occur on standing for several months.

As illustrative of the invention the diethyl ester of chloromaleic acid was saturated with water and allowed to stand. This required no more than about 1 per cent of water. The identical product to which no water was added was allowed to stand under identical conditions. Tests for acid over the untreated ester were obtained long before the same test for acid gave positive results over the moist ester. The other esters of chloromaleic acid and chlorofumaric acid may be stabilized in a similar manner.

What I claim is:

1. A moist ester of the class consisting of the monochloro- and monobromomaleates and -fumarates containing not more than 1% of water.

2. An ester of the class consisting of the monochloro- and monobromomaleates and -fumarates, which is stabilized by water dissolved therein, the water being present only in an amount not in excess of that required for saturation of the ester.

3. A moist ester of monochloromaleic acid containing not more than 1% of water.

4. An ester of monochloromaleic acid, which is stabilized by moisture dissolved therein, the moisture being present in an amount not in excess of that required to saturate the ester.

5. Diethyl chloromaleate which is stabilized by water dissolved therein, the water being present in an amount not in excess of that required for saturation of the ester.

CHARLES R. MILONE.